(12) United States Patent
Okubo et al.

(10) Patent No.: US 9,891,728 B2
(45) Date of Patent: Feb. 13, 2018

(54) DEVICE HAVING TOUCH PANEL, RADAR APPARATUS, PLOTTER APPARATUS, SHIP NETWORK SYSTEM, SYMBOL SPECIFYING METHOD AND SYMBOL SPECIFYING PROGRAM

(75) Inventors: Hiroki Okubo, Nishinomiya (JP); Keita Nishida, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 496 days.

(21) Appl. No.: 14/349,320

(22) PCT Filed: Oct. 3, 2011

(86) PCT No.: PCT/JP2011/005580
§ 371 (c)(1),
(2), (4) Date: Apr. 2, 2014

(87) PCT Pub. No.: WO2013/051050
PCT Pub. Date: Apr. 11, 2013

(65) Prior Publication Data
US 2014/0237409 A1    Aug. 21, 2014

(51) Int. Cl.
*G06F 3/041* (2006.01)
*G06F 3/0488* (2013.01)
*G06F 3/0486* (2013.01)

(52) U.S. Cl.
CPC ............ *G06F 3/041* (2013.01); *G06F 3/0486* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 8,130,271 B2* | 3/2012 | Imamura | B60R 1/00 348/148 |
| 2008/0036743 A1 | 2/2008 | Westerman et al. | |
| 2010/0005419 A1 | 1/2010 | Miichi et al. | |
| 2010/0216448 A1* | 8/2010 | Jeon | G06F 3/04817 455/418 |

(Continued)

FOREIGN PATENT DOCUMENTS

| | | |
|---|---|---|
| CN | 101285880 A | 10/2008 |
| CN | 101410781 A | 4/2009 |
| CN | 101482795 A | 7/2009 |

(Continued)

OTHER PUBLICATIONS

ISA Japanese Patent Office, International Search Report of PCT/JP2011/005580, dated Dec. 27, 2011, WIPO, 1 page.

*Primary Examiner* — Jeffrey A Gaffin
*Assistant Examiner* — Ayesha Huertas Torres
(74) *Attorney, Agent, or Firm* — Alleman Hall Creasman & Tuttle LLP

(57) ABSTRACT

A touch panel device displays a nautical chart and symbols indicating waypoints arranged on the nautical chart. The touch panel device detects touch operations at two or more positions on the display screen and touched positions thereof. The touch panel device creates an area on the display screen based on the two or more detected touched positions, specifies one or more of the symbols located within the created area, and performs cut processing and the like on the one or more of the symbols.

14 Claims, 12 Drawing Sheets

(56) References Cited

U.S. PATENT DOCUMENTS

2011/0242136 A1* 10/2011 Yamada ............... G01C 21/367
    345/660

FOREIGN PATENT DOCUMENTS

| | | |
|---|---|---|
| CN | 101937302 A | 1/2011 |
| CN | 102023786 A | 4/2011 |
| CN | 102084327 A | 6/2011 |
| JP | 2002324241 A | 11/2002 |
| JP | 2011175310 A | 9/2011 |
| WO | 2007089766 A2 | 8/2007 |
| WO | 2010071630 A1 | 6/2010 |

* cited by examiner

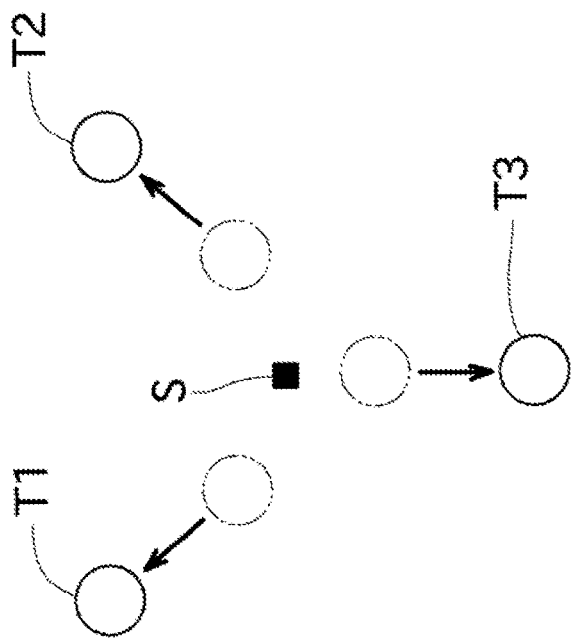
FIG. 3(a) GRAB OPERATION
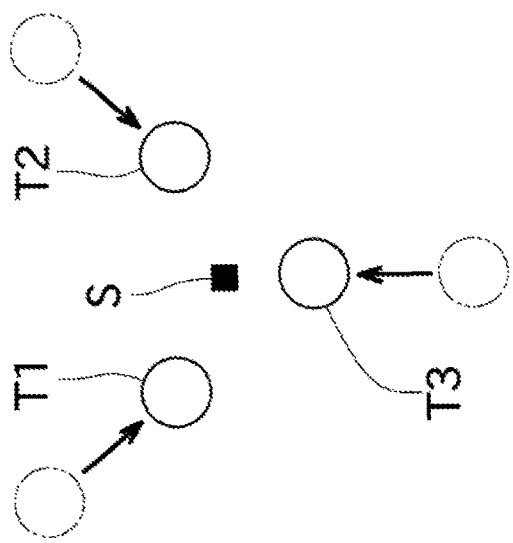
FIG. 3(b) DROP OPERATION

DEVICE HAVING TOUCH PANEL, RADAR APPARATUS, PLOTTER APPARATUS, SHIP NETWORK SYSTEM, SYMBOL SPECIFYING METHOD AND SYMBOL SPECIFYING PROGRAM

TECHNICAL FIELD

The present invention mainly relates to a device having a touch panel, which is able to display an image and a symbol arranged on the image.

BACKGROUND ART

Conventionally, devices having touch panels (hereinafter, may simply be referred to as the touch panel devices) which can recognize touches at two or more positions have been known. Patent Document 1 discloses a method of performing predetermined processing with such kind of touch panel device, a touch pad and the like according to touch operation contents (touch gestures), and discloses specific examples of the predetermined processing.

In Patent Document 1, a touch gesture of moving three-point touches (a thumb, an index finger, and a middle finger) close to each other is illustrated, and cut processing performed in response to this touch gesture is described. Moreover, the touch gesture of moving the three-point touches away from each other is also illustrated, and paste processing performed in response to this touch gesture is described (see the paragraph 0174 and FIG. 29E).

Moreover, in the paragraphs 0145, 0146 and 0150, a specific flow of performing copy and paste processing by touch operation is described. According to the description, an operator first performs the touch operation or uses a mouse, to select an object to copy. Then, the operator performs a touch gesture to perform the copy processing. Next, the operator performs the touch operation or uses the mouse, to specify a position to paste. Then, the operator performs a touch gesture to perform the paste processing. By performing the operation described above, the copy and paste processing can be performed.

Moreover, in a case of moving an icon or the like on the display screen with touch operation, a method of moving the icon by touching the icon or the like over a predetermined period of time and then moving it without removing the hand from the display screen, is commonly known.

REFERENCE DOCUMENTS OF CONVENTIONAL ART

Patent Document(s)

Patent Document 1: US2008/0036743A1

DISCLOSURE OF THE INVENTION

Problems to be Solved by the Invention

However, since the copy and paste processing of Patent Document 1 requires a plurality of times of operations, it may be troublesome to the operator depending on the object to perform the processing on.

Meanwhile, with the operation utilizing the touch over the predetermined time period, since the operator needs to wait for the predetermined time period, the operation cannot be performed promptly. Moreover, since the touch shorter than the predetermined time period is normally associated with other processing, the other processing may be performed mistakenly when moving the icon.

Note that, the above problems are common, not only when performing copy processing and moving an icon, but through all kinds of operations performed by selecting a symbol (in the concept including an icon, a mark, etc.) in touch operation.

The present invention is made in view of the above situations and aims to provide a touch panel device which is able to select one or more symbols with operation which is simple and with which mistakes hardly occur.

SUMMARY AND EFFECT(S) OF THE INVENTION

Problems to be solved by the present invention are described above, and means for solving the problems and effects thereof will be described below.

According to a first aspect of the present invention, a device having a touch panel with the following configuration is provided. That is, the device having the touch panel includes a display unit, a detector, and a controller. The display unit displays, on a display screen, an image and symbols arranged on the image. The detector detects touch operations at two or more positions on the display screen and touched positions thereof. The controller creates an area on the display screen based on the two or more touched positions detected by the detector, and specifies one or more of the symbols located within the created area.

Thus, the one or more symbols can be selected by the operation that is simple and with which mistakes hardly occur.

With the above device having the touch panel, among the one or more of the symbols within the created area, the controller is preferred to specify the symbol that is closest to a center of the area by differentiating the symbol from the other symbols.

Thus, a single symbol can be selected by the operation that is simple and with which mistakes hardly occur.

With the above device having the touch panel, the controller is preferred to set the touched positions used in creating the area to be latest positions of the touch operations at the two or more positions respectively.

Thus, an operator can adjust the one or more of the symbols to be selected by moving the touched positions even after touching the display screen.

With the above device having the touch panel, even after the detector no longer detects the touch operations, the controller is preferred to keep the one or more of the symbols specified, the one or more of the symbols located within the area that is created based on the latest touched positions.

Thus, the one or more of the symbols are kept specified even if the operator does not keep touching the display screen, and therefore, operability can be improved.

With the above device having the touch panel, the controller is preferred to perform, on the specified one or more of the symbols, either one of cut processing in which the one or more of the symbols are removed and saved temporarily, and copy processing in which the one or more of the symbols are copied.

Thus, the operator can specify the one or more of the target symbols for either one of the cut processing and the copy processing by the operation that is simple and with which mistakes hardly occur.

With the above device having the touch panel, when the touch operations are performed so that the two or more touched positions approach the one or more of the symbols, the controller is preferred to perform either one of the cut processing and the copy processing on the one or more of the symbols.

Thus, the operator can specify the one or more of the target symbols for either one of the cut processing and the copy processing by the operation that hardly interferes with other touch operation and is instinctive.

With the above device having the touch panel, after the controller performs either one of the cut processing and the copy processing, when touch operations are performed at two or more touched positions so that the positions are separated from a predetermined position, the controller is preferred to perform paste processing in which the one or more of the symbols are pasted to the predetermined position.

Thus, the operator can specify the position to be pasted to, by the operation that hardly interferes with other touch operation and is instinctive.

With the above device having the touch panel, when the touch operations are performed so that the two or more touched positions are separated from the one or more of the symbols, the controller is preferred to perform processing in which only the surrounding of the one or more of the symbols is displayed enlarged on the display unit.

Thus, it can be such that only the surrounding of the one or more of the symbols is displayed enlarged by the touch operation resembling pinch-out operation in which normal enlarge processing is performed (operation of touching the two positions and bringing the respective touched positions away from each other), and therefore, the operator can perform instinctive operation.

With the above device having the touch panel, it is preferred to have the following configuration. That is, the device includes a memory configured to store nautical chart information. The controller displays a position of a ship and the symbols on a nautical chart based on positional information received from a GNSS sensor.

Thus, the effect that the one or more of the symbols can be specified by the operation which is simple and with which mistakes hardly occur, can be exerted with ship instrument.

According to other aspects of the present invention, a radar apparatus, a plotter apparatus, and a ship network system each including the device having the touch panel, are provided.

Thus, the effects of the present invention can be exerted with radar apparatuses, plotter apparatuses, and ship network systems.

According to a second aspect of the present invention, the following symbol specifying method is provided. That is, the symbol specifying method includes displaying, on a display screen, an image and symbols arranged on the image. The symbol specifying method includes detecting touch operations at two or more positions on the display screen and touched positions thereof. The symbol specifying method includes creating an area on the display screen based on the two or more touched positions detected by the detecting the touch operations, and specifying one or more of the symbols located within the created area.

Thus, the one or more symbols can be selected by the operation that is simple and with which mistakes hardly occur.

According to a third aspect of the present invention, a symbol specifying program having the following configuration is provided. That is, the symbol specifying program causes a computer to display, on a display screen, an image and symbols arranged on the image. The symbol specifying program causes a computer to detect touch operations at two or more positions on the display screen and touched positions thereof. The symbol specifying program causes a computer to create an area on the display screen based on the two or more touched positions detected by the detecting the touch operations, and specify one or more of the symbols located within the created area.

Thus, the one or more of the symbols can be selected by the operation that is simple and with which mistakes hardly occur.

According to a fourth aspect of the present invention, a device having a touch panel with the following configuration is provided. That is, the device having the touch panel includes a display unit, a detector, and a controller. The display unit displays, on a display screen, an image and symbols arranged on the image. The detector detects touch operations on the display screen and a touched position thereof. The controller creates an area on the display screen based on the touched position detected by the detector, and specifies one or more of the symbols located within the created area.

Thus, the one or more of the symbols can be selected by the operation that is simple and with which mistakes hardly occur (including operation performed by touching a single position).

BRIEF DESCRIPTION OF DRAWINGS

FIGS. 3(a) and 3(b) show views for describing a grab operation and a drop operation.

MODE(S) FOR CARRYING OUT THE INVENTION

Figure 1:
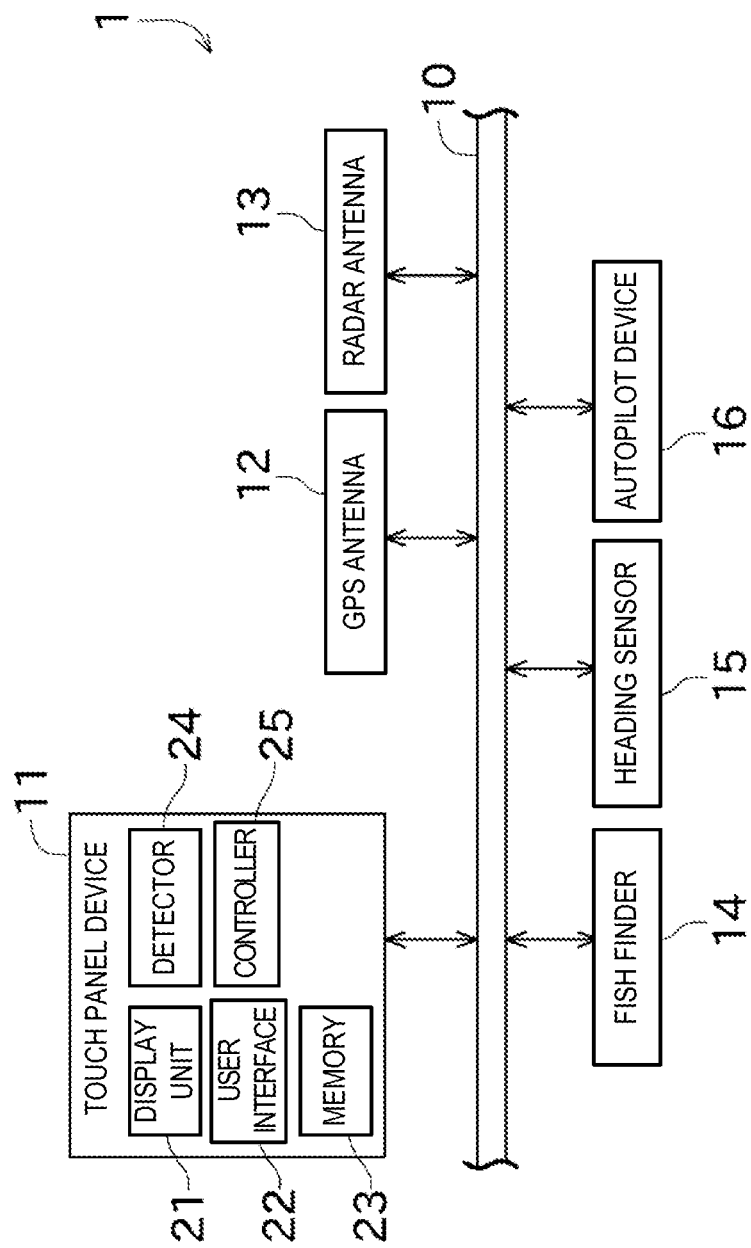
FIG. 1 is a block diagram illustrating an overall configuration of a ship instrument network system.
Figure 2:
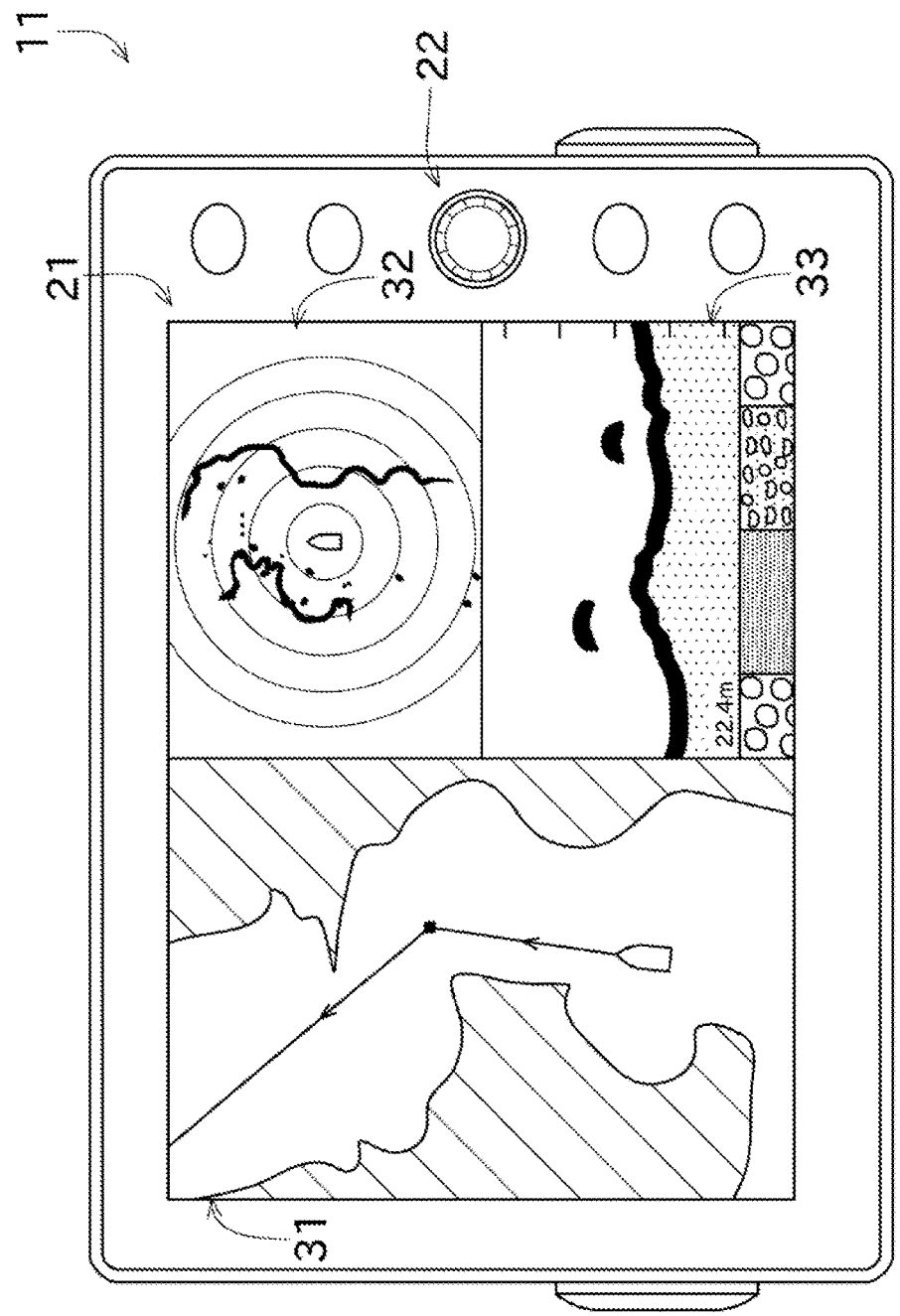
FIG. 2 is a front view of a touch panel device.

Next, one embodiment of the present invention is described with reference to the drawings. FIG. 1 is a block diagram illustrating an overall configuration of a ship instrument network system 1. FIG. 2 is a front view of a touch panel device 11.

The ship instrument network system 1 of this embodiment includes a plurality of ship instruments connected to a ship network 10. The ship instruments can exchange, for example, detected information via the ship network 10 with each other. As the standard of the ship network 10, LAN (Local Area Network) or CAN (Controller Area Network) can be adopted, for example.

As illustrated in FIG. 1, the ship instrument network system 1 of this embodiment includes a device having a touch panel (hereinafter, simply be referred to as the touch panel device) 11, a GPS antenna (GNSS sensor) 12, a radar antenna 13, a fish finder (acoustic sensor) 14, a heading sensor 15, and an autopilot device 16.

The touch panel device 11 is configured to create and display an image (sensor image) based on information detected by the other ship instruments (sensors), detect a touch operation on a display screen, and perform processing according to the detection result. Specifically, the touch panel device 11 includes a display unit 21, a user interface 22, a memory 23, a detector 24, and a controller 25.

The display unit 21 is comprised of, for example, a liquid crystal display, and can display the sensor image, various setting screens and the like on the display screen as described above.

The user interface 22 is, for example, comprised of a rotary key to which a clockwise or counterclockwise rotational operation can be performed, and a hardware key, such as a menu key or the like for calling out a menu screen. Note that, with the touch panel device 11, input and instruction can be performed by touch operation(s) on the display screen. Therefore, the number of keys of the user interface 22 can be reduced.

The memory 23 stores, for example, contents of program(s) to be executed by the controller 25, nautical chart information, and navigation route(s) set by an operator.

The detector 24 detects the touch operation performed on the display screen by the operator. In this embodiment, a projected capacitance system is used as a system for detecting the touch operation. This system is configured such that a plurality of electrodes with high transparency are disposed on a display panel and a touched position is detected based on a change of an electric capacity of each electrode caused when a fingertip approaches the panel. With this configuration, not only the touched position but also a finger motion in a touching state (change of the touched position) can be detected. Moreover, when two or more positions are touched simultaneously, the detector 24 can also detect the respective touched positions and changes of the respective touched positions. The touched position(s) and the change of the touched position(s) detected by the detector 24 are outputted to the controller 25. Note that, the system for detecting the touch operation is not limited to the projected capacitance system, and any other suitable system may be adopted. Moreover, other than the touch operation by a finger, a configuration in which a touch operation performed by a tapered stick-like member is detected may be adopted, for example.

The controller 25 creates the sensor image (a radar image, a nautical chart around the ship, etc.) based on stored contents in the memory 23 and information received from other ship instrument(s), and displays it on the display unit 21. The controller 25 receives information from a plurality of ship instruments and creates a plurality of sensor images. The controller 25 can switch a screen mode between a mode for displaying only one of the plurality of sensor images on the display screen (full screen mode) and a mode for dividing the display screen and displaying a plurality of sensor images thereon (divided screen mode, see FIG. 2).

Moreover, the controller 25 performs matching between the change of the touched position detected by the detector 24 and predetermined touch operation contents (touch gestures), and thereby, identifies which touch gesture is performed by the operator. Then, the controller 25 performs processing corresponding to the identified touch gesture.

One specific example of the touch gestures includes a "drag operation." The drag operation is a touch gesture of moving a touching finger (normally one finger) on the display screen to a predetermined direction without separating it from the display screen. Scrolling of the image is normally associated with this drag operation. Note that, the drag operation also includes an operation of quickly moving the finger while touching the display screen (flick operation), and the like. Moreover, another example of the touch gestures includes a "pinch operation." The pinch operation is an operation of, without separating two touching fingers from the display screen, bringing the fingers close to each other (pinch in) or separating them from each other (pinch out). Processing of changing a scale of the image is normally associated with this pinch operation. Note that, the controller 25 can also identify other various touch gestures than the examples given above.

The GPS antenna 12 receives positioning signals from GPS satellites (GNSS satellites) and outputs them to, for example, the touch panel device 11 via the ship network 10. The controller 25 of the touch panel device 11 obtains a location of the ship (specifically, a location of the GPS antenna and a terrestrial reference absolute position) based on the positioning signals. Note that, a configuration in which the calculation for obtaining the location based on the positioning signals is performed on the GPS antenna 12 side and the ship location is outputted to the touch panel device 11 may be adopted.

The touch panel device 11 can exert a function as a navigation device based on the obtained ship location and the nautical chart information stored in the memory 23. Specifically, based on the acquired ship location and the nautical chart information stored in the memory 23, the controller 25 can superimpose the ship location on the nautical chart and display it on the display unit 21. Moreover, the controller 25 can obtain a ground speed and a trace of the ship by utilizing the ship location which changes with time, and display them on the display unit 21. Further, the controller 25 can create a navigation route and display it on the display unit 21 based on the operator's selecting of a destination and a waypoint (stopover point) with the touch operation (see a first sensor image 31 illustrated in FIG. 2).

The radar antenna 13 transmits a microwave and receives a reflection wave from an object. The reflection wave is suitably signal-processed and then outputted to the touch panel device 11. The touch panel device 11 creates a radar image based on the reflection wave. Specifically, the controller 25 of the touch panel device 11 obtains a distance of the object based on a time length from the transmission of the microwave to the reception of the reflection wave. Moreover, the controller 25 obtains a direction in which the object exists, based on a direction to which the microwave is transmitted. The controller 25 creates the radar image as described above and displays it on the display unit 21 (see a second sensor image 32 illustrated in FIG. 2).

The fish finder 14 is comprised of a transducer and an analyzer. The transducer is installed in, for example, the bottom of the ship, and discharges an ultrasonic wave directly below into the sea and receives the reflection wave from the sea bottom or a school of fish. The analyzer creates fish finding data (data acquired by the fish finder and data of the school of fish or the sea bottom) based on the reflection wave. Moreover, the fish finder 14 of this embodiment has a function to determine a state of the sea bottom (bottom sediment type) based on the acquired fish finding data. Specifically, the analyzer can determine which kind the sea bottom falls in with higher possibility, among rocks, gravel (stones), sand, and mud, by analyzing the received reflection wave. The fish finding data and the determined bottom sediment type are outputted to the touch panel device 11. Then, the controller 25 of the touch panel device 11 creates a third sensor image 33 based on the received data (see FIG. 2) and displays it on the display unit 21. In the third sensor image 33, the vertical axis indicates the fish finding data and the horizontal axis indicates a timing at which the fish finding data is acquired (the data is older as it goes toward the left end of the display screen).

The heading sensor 15 is configured to detect a heading of the ship (a direction to which a bow of the ship is heading) by a terrestrial reference absolute position. Generally, a ship travels forward, toward its bow direction. Therefore, it can be said that the heading sensor 15 detects an azimuth of the forward direction of the hull of the ship. For example, a magnetic azimuth sensor or a GPS compass may be used as the heading sensor 15.

The autopilot device 16 is a device for automatically controlling a rudder so that the ship travels along the set navigation route. Specifically, the autopilot device 16 obtains how much the bow of the ship is to be changed based on the heading acquired from the heading sensor 15 and the navigation route acquired from the touch panel device 11. Then, the autopilot device 16 matches the course of the ship with the navigation route by changing an angle of the rudder according to the obtained value.

The ship instrument network system 1 of this embodiment is configured as described above. Note that, the ship instruments constituting the ship instrument network system 1 are arbitrary, and a configuration in which ship instrument(s) other than those described above are connected, or a configuration in which a plurality of similar types of ship instruments are connected may be adopted. Moreover, a configuration in which the processing of the data acquired by the ship instruments is performed by the ship instrument concerned may be adopted, or a configuration in which the processing of the data acquired by the ship instruments is performed by the controller 25 of the touch panel device 11 may be adopted.

Next, a method of changing the position of the waypoint with the touch operation is described.

First, a "grab operation" and a "drop operation" which are touch gestures used to, for example, change the position of the waypoint are described with reference to FIGS. 3(a) and 3(b). FIGS. 3(a) and 3(b) show views for describing the grab operation and the drop operation. In FIG. 3, a first touch T1, a second touch T2, a third touch T3, and a symbol S indicating the waypoint are displayed. FIG. 3(a) is the view for describing the grab operation. As illustrated in FIG. 3(a), the grab operation is an operation of moving the positions of the respective three-point touches (e.g., a thumb, an index finger, and a middle finger) close to the symbol S and to narrow a distance between the positions of the respective touches. Meanwhile, FIG. 3(b) is the view for describing the drop operation. As illustrated in FIG. 3(b), the drop operation is an operation of moving the positions of the respective three-point touches (e.g., a thumb, an index finger, and a middle finger) away from the symbol S and to extend the distance between the positions of the respective touches. When the controller 25 identifies the grab operation or the drop operation based on the detection result of the detector 24, it also simultaneously specifies the symbol to serve as a target of these kinds of operations.

Next, with reference to FIGS. 4(a), 4(b), 5(a) and 5(b), it is described about which symbol is to be specified as the operation target when the controller 25 identifies the grab operation or the drop operation. FIGS. 4(a), 4(b), 5(a) and 5(b) are views illustrating symbols to be specified by the grab operation and the drop operation, respectively. In this embodiment, when the grab operation is performed, an area is created based on the positions of the respective three-point touches immediately before the fingers are separated from the display screen (latest touched positions detected by the detector 24, touched positions immediately before the detector 24 no longer detects the touches), and the symbol located within the created area is specified as the operation target. Therefore, for example, when the first touch T1 is separated from the display screen first and then the second touch T2 is separated next, for the first touch T1, the touched position from which the first touch T1 is separated from the display screen is used to create the area, and for the second touch T2, the touched position from which the second touch T2 is separated from the display screen is used to create the area. On the other hand, when the drop operation is performed, an area is created based on the touched positions immediately after touching the display screen, and the symbol located within the created area is specified. Note that, in this embodiment, the configuration is adopted in which the symbol is kept specified even after the detector 24 no longer detects the touch (after the finger is separated from the display screen).

Figure 4A:
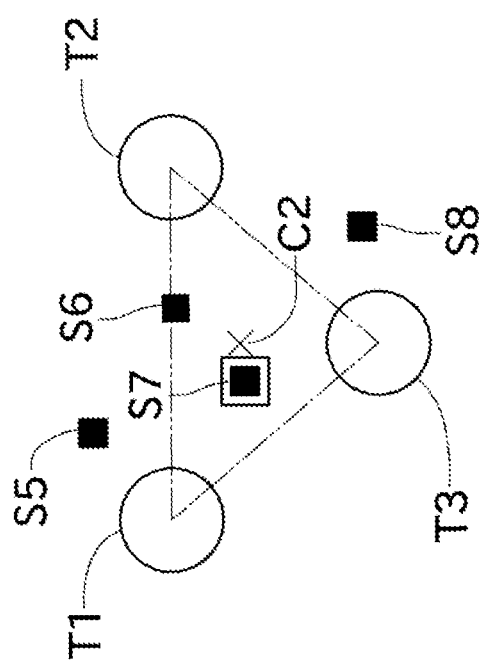
FIGS. 4(a) and 4(b) show views illustrating symbols specified by the grab operation and the drop operation.
Figure 4B:
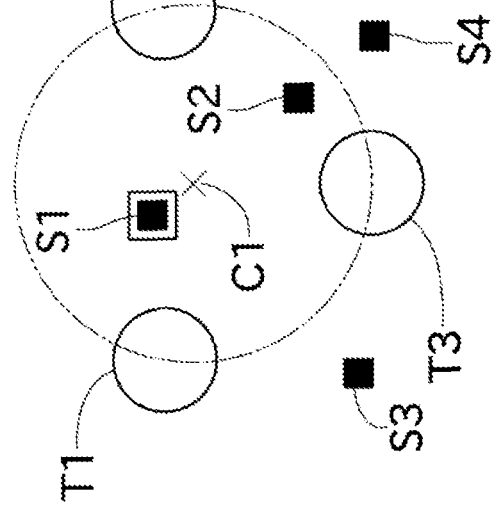

Moreover, as a specific example of the area creating method, for example, as illustrated in FIG. 4(a), it may be considered to specify a symbol S1 which is closest to a center C1 of a virtual circle passing through the three touched positions. Moreover, as another example, as illustrated in FIG. 4(b), it may be considered to specify a symbol S7 which is closest to a median point C2 of a virtual triangle coupling the three touched positions. The virtual graphics, the centers thereof (including the median point) and the like described above are not displayed on the display unit 21 in this embodiment; however, they may be displayed.

Figure 5A:
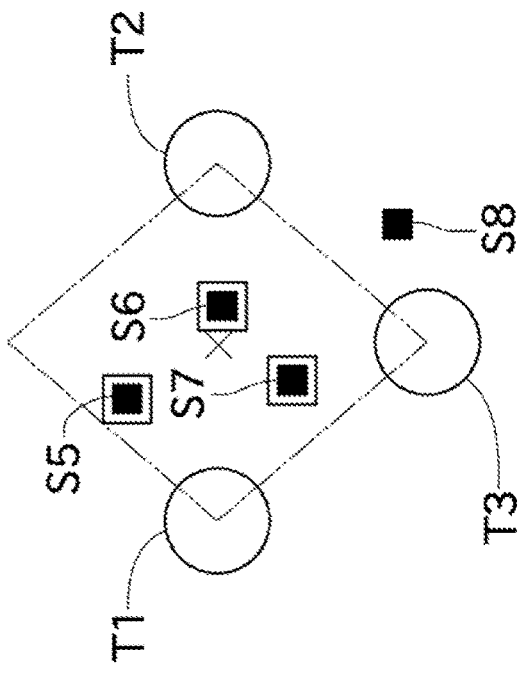
FIGS. 5(a) and (b) show views illustrating other examples of the symbols specified by the grab operation and the drop operation.
Figure 5B:
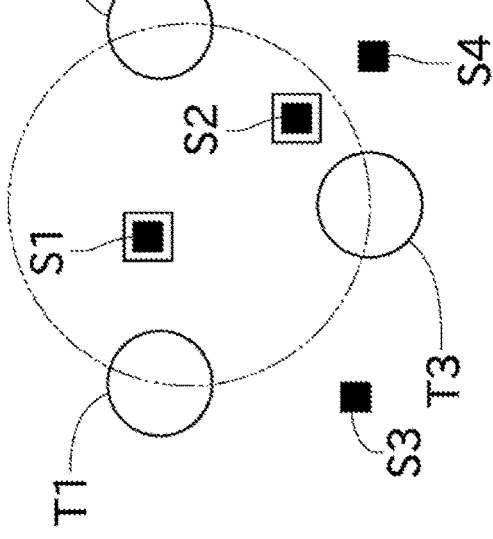

Note that, the specifying method of the symbol described above is an example, and various kinds of other methods can be given. For example, instead of specifying only one symbol to be the operation target, as illustrated in FIG. 5(a), a configuration may be adopted, in which all the symbols located inside the virtual circle passing through the three touched positions are specified. In this case, the two symbols S1 and S2 are specified as the operation targets. Moreover, as illustrated in FIG. 5(b), a configuration may be adopted, in which a virtual rectangular area is created, for example, by inverting the virtual triangle, which is formed based on the three touched positions, with respect to the longest side among the three sides of the triangle (the line coupling between the first touch T1 and the second touch T2), and specify all the symbols located within the virtual rectangular area to be the operation targets. In this case, the symbols S5, S6 and S7 are specified. Further, a parallelogram-shaped virtual area may be created by rotating the triangle by 180° about a bisecting point of the longest side among the three sides instead of inverting the triangle, and all the symbols inside the parallelogram-shaped virtual area may be specified as the operation targets. Moreover, also in the cases of FIGS. 5(a) and 5(b), obviously, it may be such that the center of the area described above is obtained and then only one symbol close to the center is specified.

Figure 6:
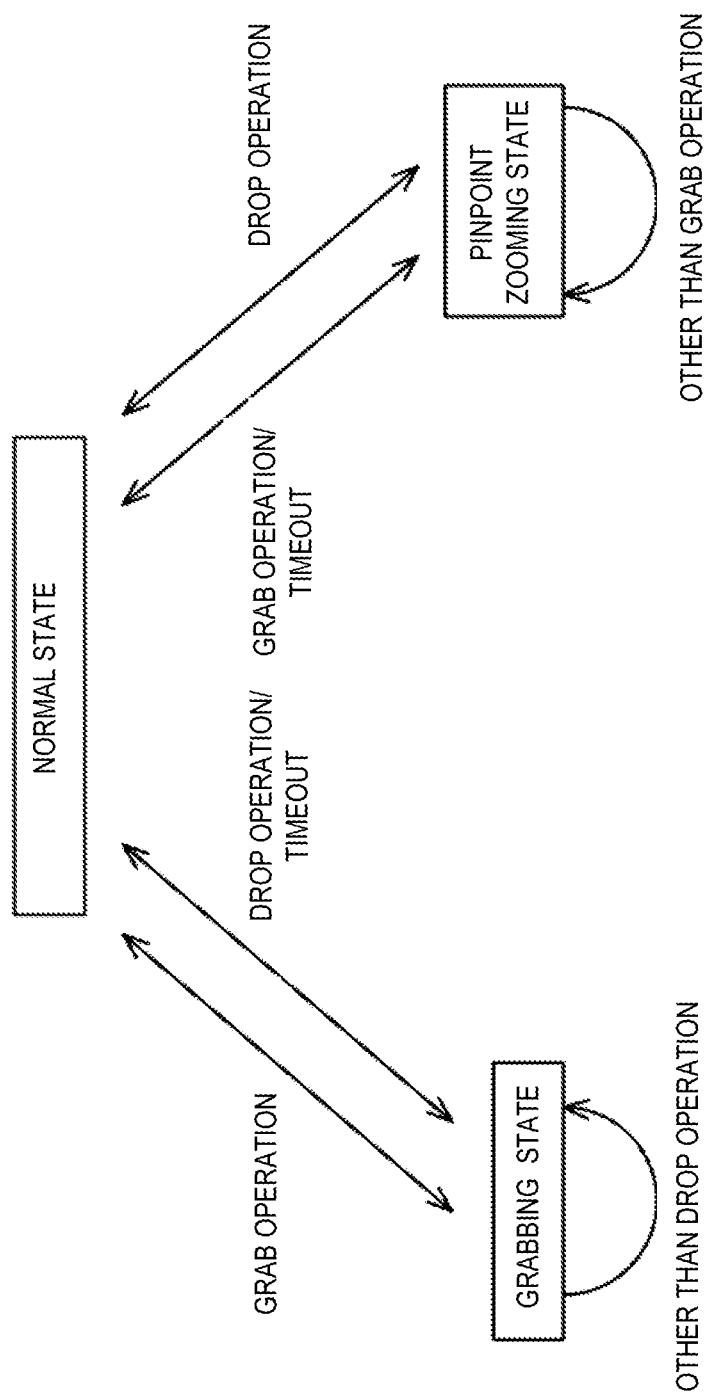
FIG. 6 is a view for describing operation performed to shift to respective states.

Next, "states" to be set in this embodiment are described with reference to FIG. 6. FIG. 6 is a view for describing operation which is performed to shift to the respective states. When the grab operation and the drop operation are performed, the controller 25 performs different processing according to the state. As the states, a normal state, a grabbing state, and a pinpoint zooming state are set. As illustrated in FIG. 6, from the normal state, by performing the grab operation, the state is shifted to the grabbing state. Then, from the grabbing state, when the drop operation is performed or a predetermined period of time elapses, the state is shifted back to the normal state. Moreover, from the normal state, by performing the drop operation, the state is shifted to the pinpoint zooming state. Then, from the pinpoint zooming state, when the grab operation is performed or a predetermined period of time elapses, the state is shifted back to the normal state.

Figure 7:
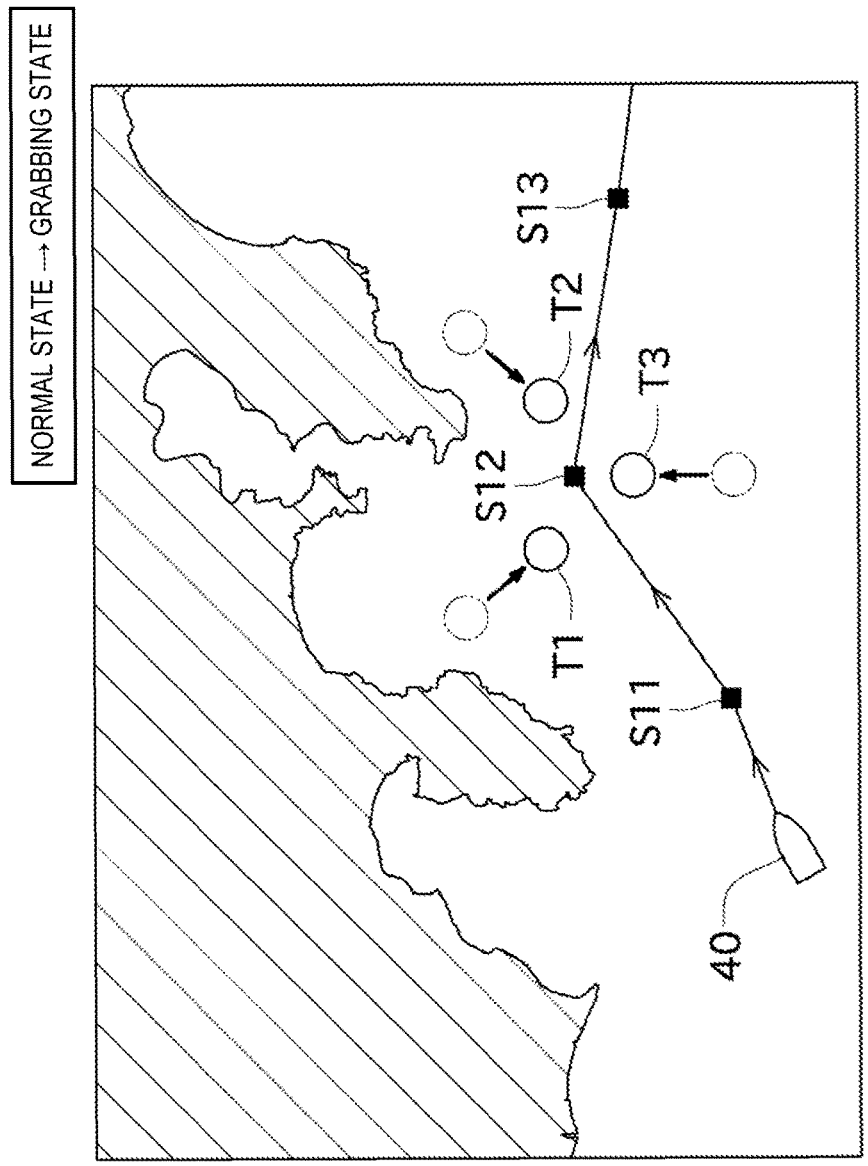
FIG. 7 is a view illustrating a display screen when the grab operation is performed on the symbol in a normal state.
Figure 8:
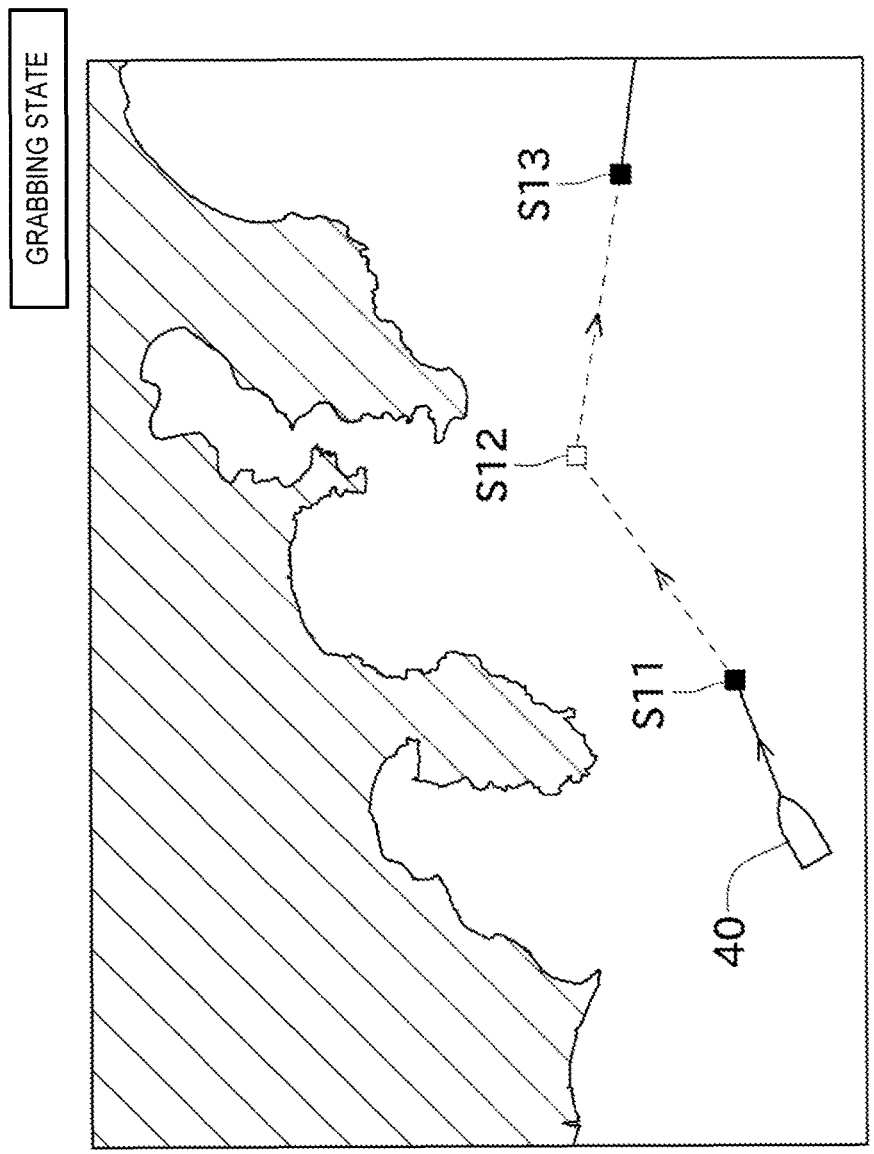
FIG. 8 is a view illustrating the display screen when the state is shifted to a grabbing state.
Figure 9:
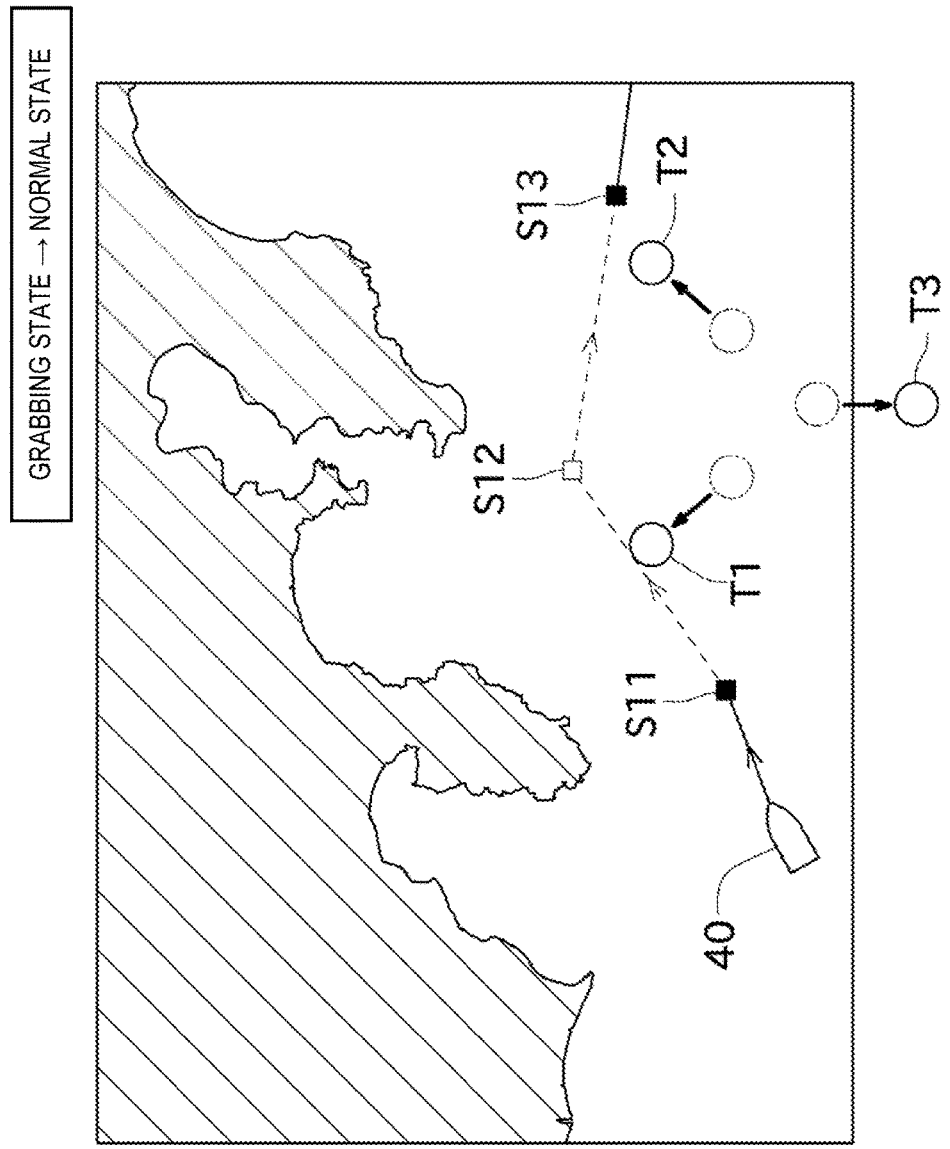
FIG. 9 is a view illustrating the display screen when the drop operation is performed to a predetermined position in the grabbing state.

Next, the operation that the operator performs to change the position of the waypoint by using the grab operation and the drop operation, and the processing performed by the controller according to the operation of the operator are described with reference to FIGS. 7 to 9. FIGS. 7 to 9 are views illustrating the display screen when changing the position of the waypoint.

FIG. 7 is displayed with the first sensor image 31. In FIG. 7, a ship mark 40 indicating the position of the ship, symbols S11, S12 and S13 indicating the waypoints are displayed on the nautical chart. Moreover, the state is the normal state before the operator performs the operation. When changing the waypoint, the operator performs the grab operation (see FIG. 7) on the waypoint desired to change (the symbol S12 in this embodiment).

When performing the grab operation in the normal state, the state is shifted to the grabbing state, and cut processing is performed on the target symbol of the grab operation. Therefore, as illustrated in FIG. 8, the display mode of the symbol S12 is changed and a navigation route near the symbol S12 is displayed with a dot line. Note that, instead of the display mode described above, a configuration may be adopted, in which the symbol S12 and the navigation route near the symbol S12 are not displayed completely.

Figure 10:
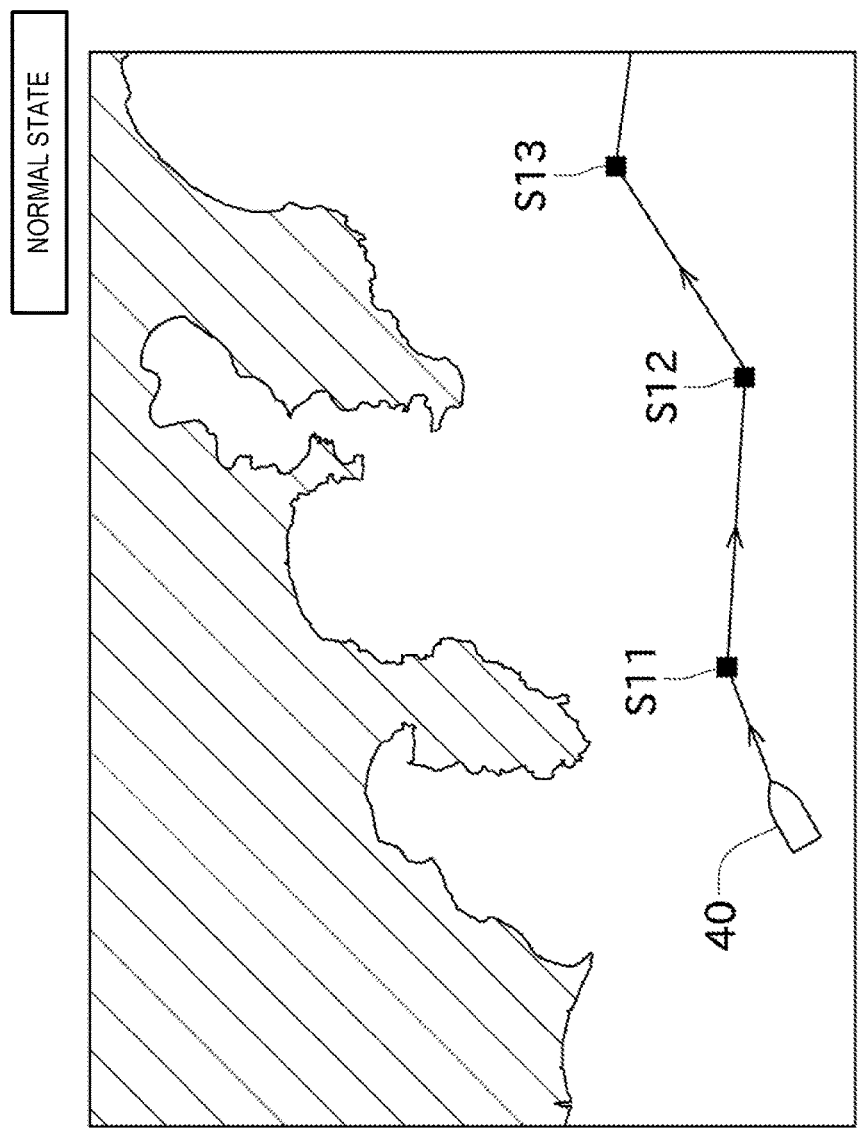
FIG. 10 is a view illustrating the display screen after the state is returned back to the normal state by the drop operation.

Then, the operator determines a position of a changed destination of the symbol S12, and performs the drop operation so as to spread the fingers centering on the position (see FIG. 9). When the drop operation is performed in the grabbing state, the state is shifted to the normal state, and the cut-processed target is pasted. Thus, the waypoint can be moved to the position where the drop operation is performed (see FIG. 10).

As described above, in this embodiment, the selection of the symbol and the cut processing can be performed in one action, and the specification of the position to be pasted to and the paste processing can also be performed in one action. Therefore, compared to the method of Patent Document 1, simple operation is achieved.

Figure 11:
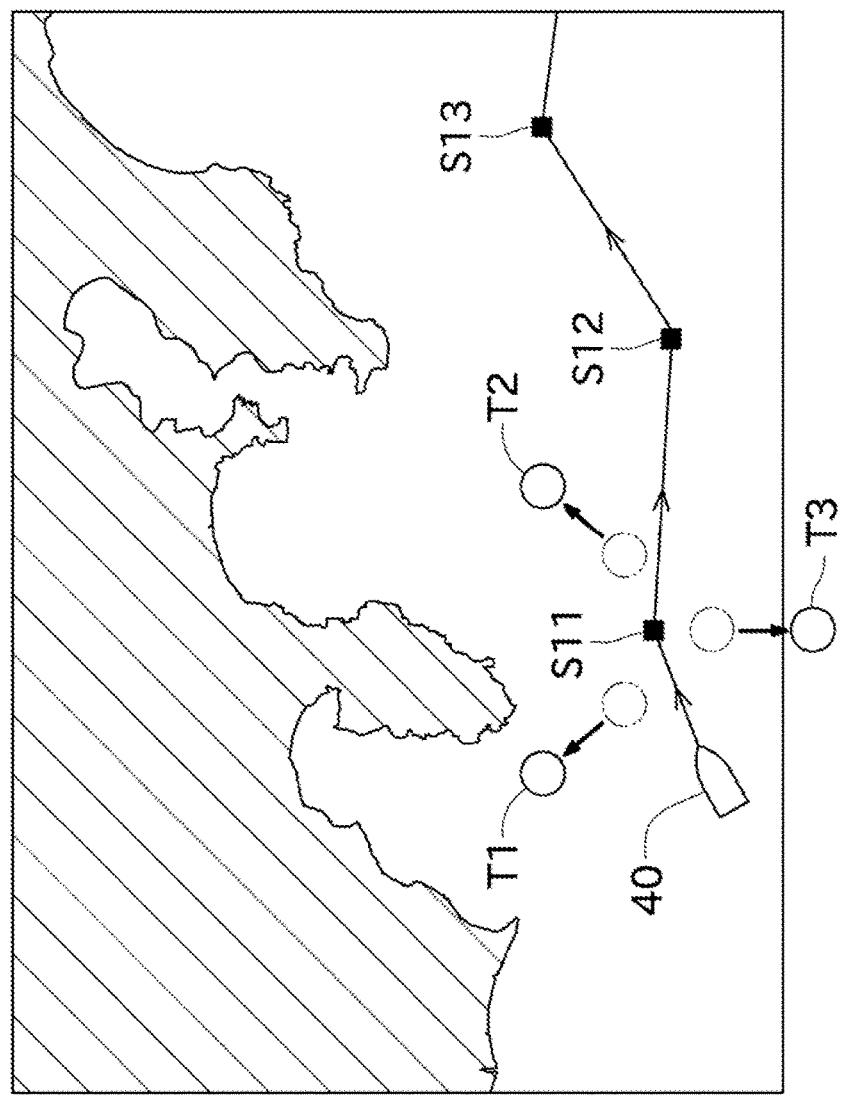
FIG. 11 is a view illustrating the display screen when the drop operation is performed on the symbol in the normal state.
Figure 12:
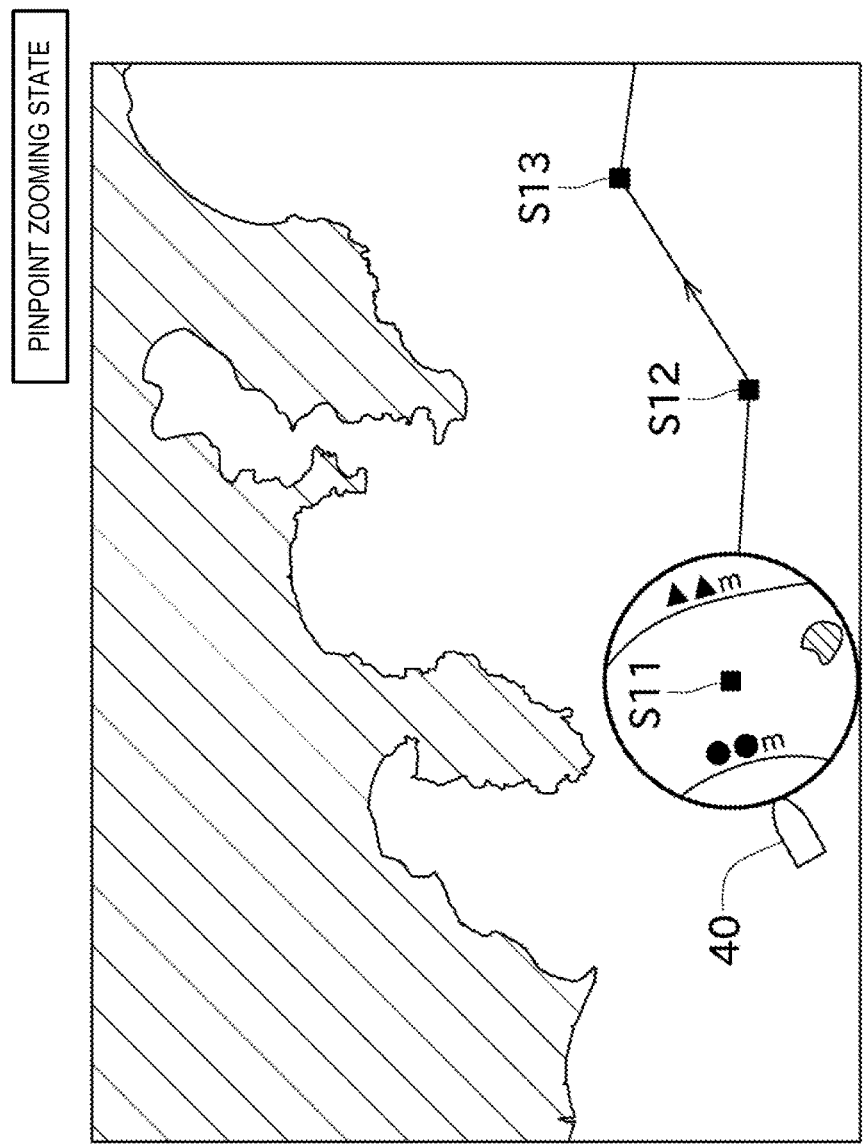
FIG. 12 is a view illustrating the display screen in a pinpoint zooming state.

Next, the pinpoint zooming is described with reference to FIGS. 11 and 12. FIGS. 11 and 12 are views illustrating the display screen when the pinpoint zooming is performed.

Generally, when the operator desires to obtain detailed information of the vicinity of a certain symbol, the operator performs the pinch-out operation or the like to enlarge the entire nautical chart. Note that, there is a case where it is required to scroll to the vicinity of the relevant symbol as needed. Although the detailed information can be obtained by enlarging the entire nautical chart, overall information becomes uneasy to obtain. Moreover, the operator needs to change the nautical chart back to a suitable scale by performing the pinch-in operation or the like after acquiring the required information.

In this embodiment, in order to solve these problems, the touch panel device is configured to be able to perform the pinpoint zooming. When the state is in the normal state, the operator performs the drop operation on the symbol of which detailed information is desired to obtain (see FIG. 11). By this, the pinpoint zooming is performed on the symbol (see FIG. 12). As illustrated in FIG. 12, only the vicinity of the symbol S11 is enlarged in the pinpoint zooming state, and therefore, the overall information can be obtained while acquiring necessary information. Moreover, in this pinpoint zooming state, by performing the grab operation on the symbol S11, the state can be shifted back to the normal state. Since the scale of the nautical chart is not changed when the state is to be shifted to the pinpoint zooming state and slightly after shifted therefrom, the readjustment of the scale is unnecessary. Note that, the touch panel device 11 may be configured so as to shift the state from the pinpoint zooming state to the normal state when the grab operation is performed at an arbitrary position on the display screen.

Note that, the drop operation performed with three fingers to perform the pinpoint zooming is in common with the pinch-out operation performed with two fingers, in view of bringing a plurality of fingers close to each other in the state of touching the display screen (note that, the grab operation and the pinch-in operation also similarly resemble each other). Therefore, by assigning the zooming function of enlarging the entire nautical chart to the pinch-out operation, and assigning the pinpoint zooming function described above to the drop operation, an operation system which is instinctive and easy to understand for the operator is achieved.

As described above, the touch panel device 11 includes the display unit 21, the detector 24, and the controller 25. The display unit 21 displays, on the display screen, the nautical chart and the symbol indicating the waypoint arranged on the nautical chart. The detector 24 detects touches at three or more positions on the display screen and their touched positions. The controller 25 creates the area based on the three or more touched positions detected by the detector 24, specifies the symbol located within the created area, and performs the cut processing thereon.

Thus, the cut processing of the symbol can be performed by the operation which is simple and with which mistakes hardly occur.

Although the preferred embodiment of the present invention is described above, the above configuration may be modified as follows, for example.

In the above embodiment, the configuration in which the area is created based at the three or more touched positions is adopted; however, a configuration in which the area is created based on two or less touched positions, or four or more touched positions may be adopted. Hereinafter, specific examples thereof are described. For example, when the number of touched positions is one, the circle centering on the touched position (a radius thereof is set in advance) can be the area. Further, when the number of touched positions is two, the circle having the diameter as the line coupling the two touched positions can be the area. Further, when the number of touched positions is four, the graphic formed by coupling all the touched positions can be the area.

In the above embodiment, the configuration in which the cut processing or the pinpoint zooming processing is performed on the specified symbol is adopted; however, the processing performed on the specified symbol is arbitrary, and a configuration in which the copy processing or deletion is performed may be adopted, for example. Moreover, a configuration in which the processing to be performed is set in advance, or the operator selects the processing after the symbol is specified may be adopted.

In the above embodiment, the configuration in which the grab operation and the drop operation are performed by using the touches at three or more positions; however, a configuration in which the grab operation and the drop operation are performed based on two or less touched positions, or four or more touched positions may be adopted.

The grab operation and the drop operation are not essential, and a configuration in which the area is created based on the touched position(s) and only the specifying of the symbol is performed may be adopted. For example, a configuration may be adopted in which tap operation (operation in which finger(s) touch for only a moment) with three fingers is performed to specify the symbol based on the tapped positions, and the operation on the specified symbol is performed by, for example, a physical key.

In this embodiment, the embodiment in which the GPS is used as one example of the GNSS is described; however, needless to say that the configuration may be such that other kind of GNSS is used.

The touch panel device 11 of this embodiments is a general display device which receives information from a plurality of sensors and displays it; however, the present invention may also be applied to a display device which displays mainly one kind of information (e.g., nautical chart information). Moreover, the present invention may also be applied to, for example, a plotter apparatus which can display symbols on a nautical chart, a radar apparatus which can display symbols on a radar image.

The touch panel device may be, other than the display device installed in ships, a display device (e.g., a navigation device) installed in movable bodies such as automobiles and aircrafts, a tablet PC, a smart phone, a handheld terminal, etc. For example, as a navigation device, similarly to the above embodiment, the present invention may be utilized, for example, to move a destination, a stopover point, and a predetermined point. Moreover, as a tablet PC and the like, the present invention may be utilized, for example, to select, move, and cut-process an icon for activating an application.

DESCRIPTION OF REFERENCE NUMERAL(S)

1 Ship Instrument Network System
10 Ship Network
11 Touch Panel Device (Device having Touch Panel)
12 GPS Antenna (GNSS Sensor)
13 Radar Antenna
14 Fish Finder
15 Heading Sensor
16 Autopilot Device
21 Display Unit
22 User Interface
23 Memory
24 Detector
25 Controller

What is claimed is:

1. A device having a touch panel that is touched by an operator, comprising:
a display unit configured to display, on a display screen, an image of a nautical chart and symbols arranged on the image;
a memory configured to store nautical chart information of the nautical chart; and
processing circuitry configured to:
detect touch operations from the operator on the touch panel at two or more positions on the display screen and touched positions thereof;
create a polygon on the image of the nautical chart on the display screen, the polygon coupling the two or more touched positions detected by the processing circuitry;
shift a state of the device based on the detected touch operations; and
specify one or more of the symbols located within the created polygon and perform different processing on the specified one or more of the symbols, in one action, according to the state.

2. The device having the touch panel of claim 1, wherein among the one or more of the symbols within the created polygon, the processing circuitry specifies the symbol that is closest to a center of the polygon by differentiating the symbol from the other symbols.

3. The device having the touch panel of claim 1, wherein the processing circuitry sets the touched positions used in creating the polygon to be latest positions of the touch operations at the two or more positions respectively.

4. The device having the touch panel of claim 3, wherein even after the touch operations are no longer detected, the processing circuitry keeps the one or more of the symbols specified, the one or more of the symbols located within the polygon that is created based on the latest touched positions.

5. The device having the touch panel of claim 1, wherein the processing circuitry performs, on the specified one or more of the symbols, either one of cut processing in which the one or more of the symbols are removed and saved temporarily, and copy processing in which the one or more of the symbols are copied.

6. The device having the touch panel of claim 5, wherein when the touch operations are performed so that the two or more touched positions approach the one or more of the symbols, the processing circuitry performs either one of the cut processing and the copy processing on the one or more of the symbols.

7. The device having the touch panel of claim 6, wherein after the processing circuitry performs either one of the cut processing and the copy processing, when the touch operations are performed at the two or more touched positions so that the positions are separated from a predetermined position, the processing circuitry performs paste processing in which the one or more of the symbols are pasted to the predetermined position.

8. The device having the touch panel of claim 1, wherein when the touch operations are performed so that the two or more touched positions are separated from the one or more of the symbols, the processing circuitry performs processing in which only a surrounding of the one or more of the symbols is displayed enlarged on the display unit.

9. The device having the touch panel of claim 1,
wherein a position of a ship and the symbols on the nautical chart are displayed based on positional information received from a GNSS sensor.

10. A radar apparatus, comprising the device having the touch panel of claim 9.

11. A plotter apparatus, comprising the device having the touch panel of claim 9.

12. A ship network system, comprising the device having the touch panel of claim 9.

13. A symbol specifying method, comprising:
configuring a memory to store nautical chart information of a nautical chart;

displaying, on a display screen, an image of the nautical chart and symbols arranged on the image;

detecting touch operations from an operator on a touch panel at two or more positions on the display screen and touched positions thereof;

creating a polygon on the image of the nautical chart on the display screen, the polygon coupling the two or more touched positions detected by the detecting the touch operations, and shifting a state of the device based on the detected touch operations; and specifying one or more of the symbols located within the created polygon and performing different processing on the specified one or more of the symbols, in one action, according to the state.

14. A device having a touch panel that is touched by an operator, comprising:

a display unit configured to display, on a display screen, an image of a nautical chart and symbols arranged on the image;

a memory configured to store nautical chart information of the nautical chart; and processing circuitry configured to:

detect touch operations from the operator on the touch panel on the display screen and a touched position thereof;

create a polygon on the image of the nautical chart on the display screen, the polygon coupling to the touched position detected by the processing circuitry;

shift a state of the device based on the detected touch operations; and specify one or more of the symbols located within the created polygon and perform different processing on the specified one or more of the symbols, in one action, according to the state.

* * * * *